United States Patent
Mellinger et al.

(10) Patent No.: US 7,930,753 B2
(45) Date of Patent: Apr. 19, 2011

(54) METHODS AND SYSTEMS FOR PERFORMING SECURITY RISK ASSESSMENTS OF INTERNET MERCHANT ENTITIES

(75) Inventors: Philip T. Mellinger, Ellicot City, MD (US); Robert G. Degen, Parker, CO (US)

(73) Assignee: First Data Corporation, Greenwood Village, CO (US)

( * ) Notice: Subject to any disclaimer, the term of this patent is extended or adjusted under 35 U.S.C. 154(b) by 2331 days.

(21) Appl. No.: 10/611,656

(22) Filed: Jun. 30, 2003

(65) Prior Publication Data

US 2004/0073445 A1    Apr. 15, 2004

Related U.S. Application Data

(60) Provisional application No. 60/393,335, filed on Jul. 1, 2002.

(51) Int. Cl.
*G06F 12/14* (2006.01)
*G06F 12/16* (2006.01)
*G06F 21/00* (2006.01)

(52) U.S. Cl. ........ 726/26; 726/27; 726/22; 726/23; 726/30; 726/2; 709/228; 709/227; 709/224; 709/223; 705/51; 705/54

(58) Field of Classification Search ............... None
See application file for complete search history.

(56) References Cited

U.S. PATENT DOCUMENTS

| | | | |
|---|---|---|---|
| 6,185,689 B1 * | 2/2001 | Todd et al. | 726/25 |
| 6,301,668 B1 * | 10/2001 | Gleichauf et al. | 726/25 |
| 6,374,358 B1 * | 4/2002 | Townsend | 726/1 |
| 6,513,122 B1 * | 1/2003 | Magdych et al. | 726/23 |
| 6,535,227 B1 * | 3/2003 | Fox et al. | 715/736 |
| 6,546,493 B1 * | 4/2003 | Magdych et al. | 726/25 |
| 6,735,701 B1 * | 5/2004 | Jacobson | 726/1 |
| 7,260,830 B2 * | 8/2007 | Sugimoto | 726/1 |
| 7,421,739 B2 * | 9/2008 | Barrett et al. | 726/26 |
| 7,478,419 B2 * | 1/2009 | Anderson et al. | 726/1 |
| 7,523,053 B2 * | 4/2009 | Pudhukottai et al. | 705/30 |
| 7,624,422 B2 * | 11/2009 | Williams et al. | 726/1 |

(Continued)

FOREIGN PATENT DOCUMENTS

EP    1310891 A2    5/2003

OTHER PUBLICATIONS

RiTA Server 3.0 Brings Merchants a Step Closer to Card Association Security Compliance; Business Wire; New York Jan. 10, 2005. p. 1.*

(Continued)

*Primary Examiner* — Syed A. Zia

(74) *Attorney, Agent, or Firm* — Kilpatrick Townsend & Stockton LLP

(57) ABSTRACT

Methods and systems are provided for assessing a security risk for a merchant entity having connectivity to a shared network. Information describing characteristics of the merchant entity are received from the merchant entity. A determination is made which test requirements of a security test scheme are to be used in assessing the security risk for the merchant entity. The security test scheme includes a set of test requirements whose satisfaction by the merchant entity is sufficient to ensure compliance with a multiple sets of security requirements defined by multiple payment-processing organizations. The security test scheme is executed with a security compliance authority server in accordance with the determined test requirements.

21 Claims, 4 Drawing Sheets

U.S. PATENT DOCUMENTS

| | | | | |
|---|---|---|---|---|
| 2003/0055962 | A1* | 3/2003 | Freund et al. | 709/225 |
| 2003/0065942 | A1* | 4/2003 | Lineman et al. | 713/201 |
| 2004/0010709 | A1* | 1/2004 | Baudoin et al. | 713/201 |
| 2005/0234755 | A1* | 10/2005 | Baggett et al. | 705/7 |

OTHER PUBLICATIONS

American Express, *American Express Data Security Standards: Section 1 General Standards*, © 1995-2002, at <http://home5.americanexpress.com/merchant/resources/fraudprevention/datasecurity_standards1.asp> (last visited Jun. 23, 2003).

American Express, *American Express Data Security Standards: Section 2 Additional Standards for Online Transactions*, © 1995-2002, at <http://home5.americanexpress.com/merchant/resources/fraudprevention/datasecurity_standards2.asp> (last visited Jun. 23, 2003).

MasterCard International Incorporated, Manual: *Electronic Commerce Security Architecture Best Practices*, Apr. 2003.

Visa USA, *Visa Cardholder Information Security Program*, © 2003, at <http://www.usa.visa.com/business/merchants/cisp_index.html.> (last visited Jun. 23, 2003).

* cited by examiner

METHODS AND SYSTEMS FOR PERFORMING SECURITY RISK ASSESSMENTS OF INTERNET MERCHANT ENTITIES

CROSS-REFERENCES TO RELATED APPLICATIONS

This application is a nonprovisional of, and claims the benefit of the filing date of, U.S. Prov. Pat. Appl. No. 60/393,335, entitled "METHODS AND SYSTEMS FOR PERFORMING RISK ASSESSMENTS FOR INTERNET MERCHANTS AND INTERNET MERCHANT GATEWAYS," the entire disclosure of which is incorporated herein by reference for all purposes.

BACKGROUND OF THE INVENTION

This application relates generally to information security. More specifically, this application relates to risk assessments regarding the security of information maintained by entities on shared networks.

A concern that has always existed with various types of transaction instruments has centered around the possibilities of fraud, theft, and other types of misappropriation of information. Over time, the nature of such concerns has shifted as technology has developed to embrace new types of transactions, always attempting to anticipate the variety of ways in which information may be used improperly. In recent years, this evolution has been particularly marked with the rise of electronic transactions in which consumers may purchase goods and enter into other types of transactions over a public shared network such as the Internet.

The public nature of the Internet has presented hackers with a mechanism for intercepting information that was traditionally confined to a private network. In particular, most electronic transactions today take place by providing information identifying card instruments, such as credit, debit, stored-value, and similar cards, to a merchant over the Internet. This information may subsequently be used by the merchant over a private network to solicit authorization for the amount of the transaction, to verify that the card instrument has not been reported stolen, and the like, but the initial presentment of information may still be intercepted by a hacker. In many cases, Internet merchants and gateways often set their electronic perimeters with little regard for security. Internet merchants also tend to store the electronic identities and financial information of their customers on their web sites behind these less-than-secure perimeters. Because the security perimeters are easily penetrable, the customer identities and financial information are at risk and, in fact, have sometimes been compromised by hackers, resulting in fraud.

In response to these concerns, card associations and other payment-processing organizations have recently been developing requirements for entities that are designed to maintain the security of sensitive information and thereby reduce the potential for fraud. In order for entities to accept the corresponding cards or instruments for transactions, they must adhere to the requirements that have been promulgated. While the existence of such requirements is expected to mitigate against the possibility of theft and fraud, they have also caused significant inconvenience to merchants. In particular, each payment-processing organization has tended to promulgate its requirements in isolation so that a merchant who wishes to offer multiple card services is faced with attempting to comply with a variety of different requirements. Furthermore, verifying compliance with each set of requirements can be extremely costly depending on the scope and complexity of the requirements.

There is accordingly a general need in the art for methods and systems that simplify accommodating diverse information-security requirements.

BRIEF SUMMARY OF THE INVENTION

Embodiments of the invention permit security risk assessments to be implemented in a comprehensive fashion that accounts for criteria set forth in multiple sets of security requirements from different payment-processing organizations. In this way, such embodiments provide a "one-stop" mechanism for security risk assessments that simplify compliance by merchant entities and simplify verification of that compliance.

In one set of embodiments, a method is provided for implementing a security risk assessment for a merchant entity having connectivity to a shared network, which may, for example, comprise an Internet merchant or an Internet merchant gateway. A set of security requirements defining protocols for implementing commercial transactions over the shared network using instruments identified with the payment-processing organization is received from each of a plurality of payment-processing organizations. A security test scheme is developed to have a set of test requirements whose satisfaction by the merchant entity is sufficient to ensure compliance with the sets of security requirements defined by the payment-processing organizations. A remote scan is performed of a network site maintained by the merchant entity on the shared network in support of shared-network commercial transactions with a security compliance authority server. The remote scan implements at least a subset of the set of test requirements to evaluate compliance by the merchant entity.

In some embodiments, a questionnaire may additionally be transmitted to the merchant entity with the security compliance authority server. The questionnaire includes queries whose truthful response identifies a level of compliance with at least some of the test requirements. In other embodiments, an on-site audit at the merchant entity may be scheduled with the security compliance authority server. The on-site audit is structured to follow a prescribed methodology for identifying a level of compliance with at least some of the test requirements. In some cases, a satisfaction level of the test requirements required for compliance may be dependent on a characteristic of the merchant entity, such as a shared-network transaction volume processed by the merchant entity over the shared network. Also, a frequency of performing the remote scan may be dependent on a characteristic of the merchant entity, such as an shared-network transaction volume processed by the merchant entity over the shared network. A report may be generated that summarizes a level of compliance by the merchant entity with the set of test requirements as determined from performing the remote scan.

In another set of embodiments, a method is provided for assessing a security risk for an merchant entity having connectivity to a shared network, which may also comprise, for example, an Internet merchant or an Internet merchant gateway. Information describing characteristics of the merchant, entity are received from the merchant entity. A determination is made which test requirements of a security test scheme are to be used in assessing the security risk for the merchant entity. The security test scheme includes a set of test requirements whose satisfaction by the merchant entity is sufficient to ensure compliance with a plurality of sets of security requirements defined by a plurality of payment-processing organizations. The security test scheme is executed with a security compliance authority server in accordance with the determined test requirements.

In some embodiments, executing the security-test scheme may comprise performing a remote scan of a network site maintained by the merchant entity on the shared network in support of shared-network commercial transactions with the security compliance authority server. In other embodiments, executing the security-test scheme may comprise scheduling an on-site audit at the merchant entity with the security compliance authority. The on-site audit is structured to follow a prescribed methodology for identifying a level of compliance with at least some of the test requirements. In still other embodiments, executing the security-test scheme may comprise transmitting a questionnaire to the merchant entity with the security compliance authority server. The questionnaire includes queries whose truthful response identifies a level of compliance with at least some of the test requirements. In some instances, determining which test requirements to use may be dependent on a characteristic of the merchant entity, such as a shared-network transaction volume processed by the merchant entity over the shared network. Also, a report may be generated summarizing a level of compliance by the merchant entity with the set of determined test requirements as evaluated from executing the security test scheme.

The methods of the present invention may be embodied in a computer-readable storage medium having a computer-readable program embodied therein for directing operation of the security compliance authority server. The security compliance authority server may include a communications system, a processor, and a storage device. The computer-readable program includes instructions for operating the security compliance authority server to process a assess a security risk for an merchant entity in accordance with the embodiments described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Embodiments of the invention provide methods and systems for implementing security risk assessments and for assessing security risks for merchant entities having connectivity to a shared network. As used herein, the term "merchant entity" is intended to be construed broadly as referring to any entity that may be involved with a commercial transaction over a shared network such as the Internet. In some instances, the discussion below refers more narrowly to "Internet merchants," which refer to any merchants that sell goods and/or services with an Internet interface, to "Internet merchant gateways," which refer to payment processors that switch transactions between an Internet merchant and its acquirer.

Figure 1:
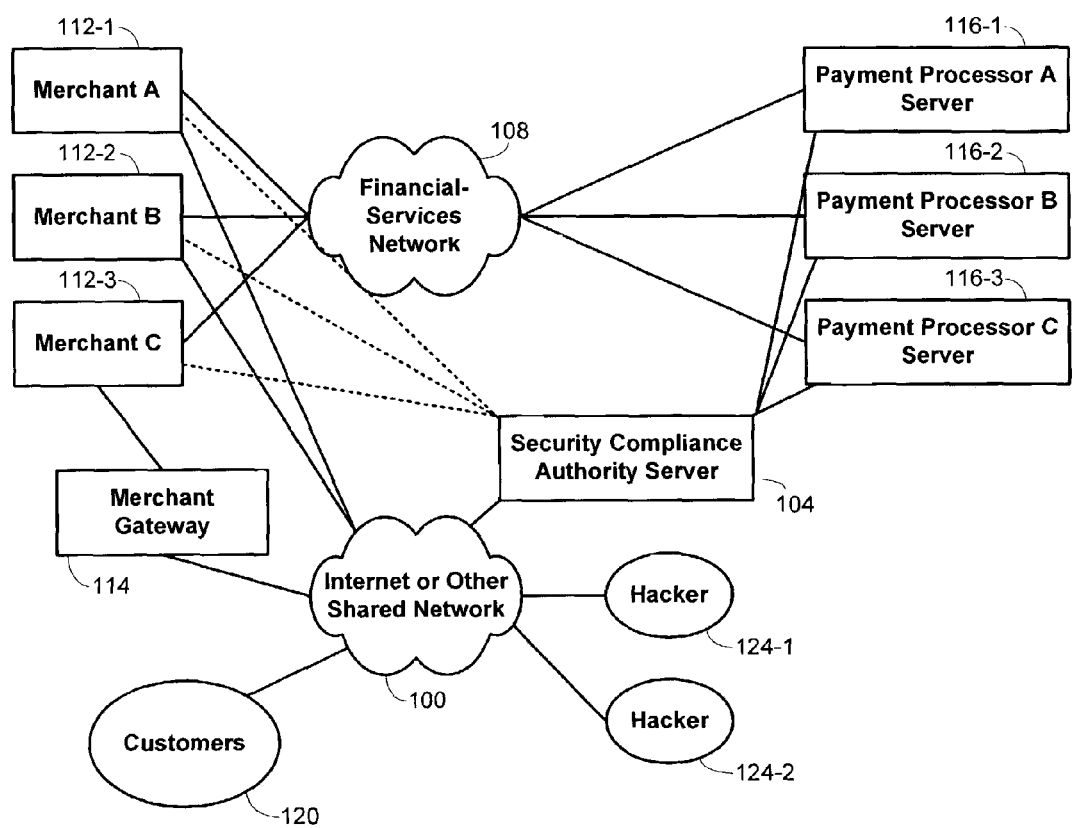
FIG. 1 is a block-diagram representation of a partial infrastructure for implementing security risk assessments in accordance with an embodiment of the invention.

The manner in which transactions may be effected with an Internet-based architecture is illustrated schematically with the block diagram in FIG. 1, although it will be appreciated that a similar structure may be provided for any shared network. In this figure, a plurality of merchants 112 having connectivity with a shared network in the form of the Internet 100 are equipped for selling goods and/or services over the Internet 100. The interfaces between the merchants 112 and the Internet 100 may be direct, as illustrated for Merchants A and B 112-1 and 112-2, or may be implemented through an Internet merchant gateway 114, as illustrated for Merchant C 112-3. The public-network character of the Internet 100 permits customers 120 of the merchants 112 to interface with servers that handle transactions.

In a typical transaction, a customer 120 who wishes to purchase goods and/or services from a merchant 112 having connectivity with the Internet, say Merchant A 112-1, connects to the Internet 100 with an Internet-access device such as a modem-equipped personal computer. The customer 120 accesses a web site for Merchant A 112-1 and makes a selection after reviewing a variety of product offerings. A server at Merchant A 112-1 calculates a total amount due, perhaps including incidental charges such as tax, shipping, and the like, and requests card information to use for payment of the total amount. The customer 120 supplies information defining a payment instrument, such as the card number printed on the face of his credit, debit, or other card, as well as supporting identifying information, such as the name printed on the card, the expiration date of the card, a verification code printed on the back of the card, and the like. Other types of information may be provided in instances where the payment instrument is different from a card, such as a check or purely electronic instrument.

Once this information has been received, Merchant A 112-1 seeks authorization for the amount of the transaction from a payment-processing organization 116 responsible for the instrument. The payment-processing organization 116 may be one of a plurality of payment-processing organizations, such as Visa®, Mastercard®, American Express®, Discover®, the National Automated Clearing House Association etc. Some of these payment-processing organizations 116 may be card associations, although the invention is intended to include any payment-processing organization. In the case of card instruments, the responsible payment-processing organization may usually be identified by a portion of the card number submitted by the customer 120 as part of the transaction. Solicitation of the approval for the transaction amount may be effected through communications over a financial-services network 108, which is usually a private network and therefore more secure than the public Internet 100. The mechanics of communicating an approval request and receiving an approval or denial of the amount are well known in the art.

It is evident from this general description of transactions that confidential instrument information may be routed over a public network such as the Internet and may be stored on merchant servers that may be accessible through that public network by hackers 124. In addition, protection of the information might be compromised more directly as a result of intentional theft or negligence by employees of the merchants. It is in response to such possibilities that the payment-processing organizations impose requirements on merchants authorized to accept their instruments to mitigate the potential to compromise the information. Failure to meet the requirements imposed by each payment-processing organization may result in penalties such as fines that escalate for repeated failures to meet the requirements, and which are supported by contractual arrangements between the payment-processing organizations and the merchants.

Examples of the types of requirements that may be imposed by payment-processing organizations may be broadly classified as data-storage requirements, data-transmission requirements, architecture requirements, notification requirements, authentication requirements, and testing requirements. Examples of data-storage requirements include: requiring that each merchant protect the stored physical data by restricting internal access among employees, both by requiring password identifications and with physical restrictions; requiring that up-to-date antivirus software be maintained on any data stores where the data is kept; requiring that log files of data access be reviewed periodically; requiring that the data be encrypted or stored in fragmentary form; requiring that encryption keys be stored securely; requiring regular database backup procedures; requiring encryption of database backups; and the like.

Examples of data-transmission requirements include: requiring that an Internet firewall be maintained; requiring that security patches be kept up to date; requiring that all data to be transmitted be encrypted; requiring that Secure Sockets Layer ("SSL") or equivalent Internet security protocols be adhered to; requiring that any display of a card number be incomplete, with missing numerals substituted by blanks or asterisks; requiring adherence to industry standards in programming of common gateway interfaces ("CGI"), scripts, servlets, and the like; requiring the removal of demonstration applications after installation of application servers; requiring hardening of application servers after installation; and the like.

Examples of architecture requirements include: requiring that a security policy be implemented and that protocols be established for maintaining the security policy; requiring the any operating system be hardened before it is used; requiring that that default passwords be changed before placing routers in production environments; requiring that passwords meet certain length and content-variation constraints; requiring that passwords be changed on prescribed schedules; requiring that new firmware releases be implemented within certain time periods; requiring that firewalls be kept up to date and scanned regularly; requiring that attempts to penetrate firewalls be logged; requiring that formal procedures be established and followed to manage firewall changes; and the like.

Examples of notification requirements include: requiring that the payment-processing organization be notified if there is any breach of any security protocol or any discovery of a failure to adhere to other security requirements; and the like.

Examples of authentication requirements include: requiring that employees of the merchant be assigned internal identifiers that may be used to track access to data; requiring that there be limits imposed on attempts to use such internal identifiers, precluding access to data if there are too many unsuccessful attempts or too long a time period between attempts; requiring that protocols be established for changing identifiers; and the like.

Examples of test requirements include: requiring that internal scans of routers be performed periodically to identify vulnerabilities; requiring that protocols be established for testing the effectiveness of all implement security requirements, and that those protocols be implemented periodically; and the like.

As will be appreciated, these types of security requirements have been outlined broadly and individual payment-processing organizations may implement them with varying degrees of specificity and/or rigidity. For example, some payment-processing organizations might specify-particular encryption standards that need to be followed, while others specify only that the encryption techniques that are used meet certain constraints. Furthermore, some payment-processing organizations may choose not to issue certain of the requirements described above while others insist on them. In addition, the requirements that are imposed by payment-processing organizations may sometimes be dependent on characteristics of the merchants 112, such as the size of the merchant, the transaction volume handled by the merchant, and the like. In such cases, for example, very large-volume merchants may be required to implement significantly more strict requirements that some smaller-volume merchants. Merely by way of example, security requirements have been established implement different aspects of the above overview in the form of the Cardholder Information Security Program implemented by Visa®, in the form of the Data Security Standards implemented by American Express®, and in the form of the Electronic Commerce Security Architecture Best Practices implemented by MasterCard®, among others.

According to embodiments of the invention, a security compliance authority server 104 is provided to implement security risk assessments that ensure compliance of merchants 112 simultaneously with multiple sets of security requirements. The security compliance authority server 104 may be integrated within the architecture shown in FIG. 1 to interact both with the payment-processing organizations 116 and with the merchants 112, perhaps through the Internet or other shared network 100 to effect certain tests as described below or perhaps directly as indicated with the dashed lines.

Figure 2:
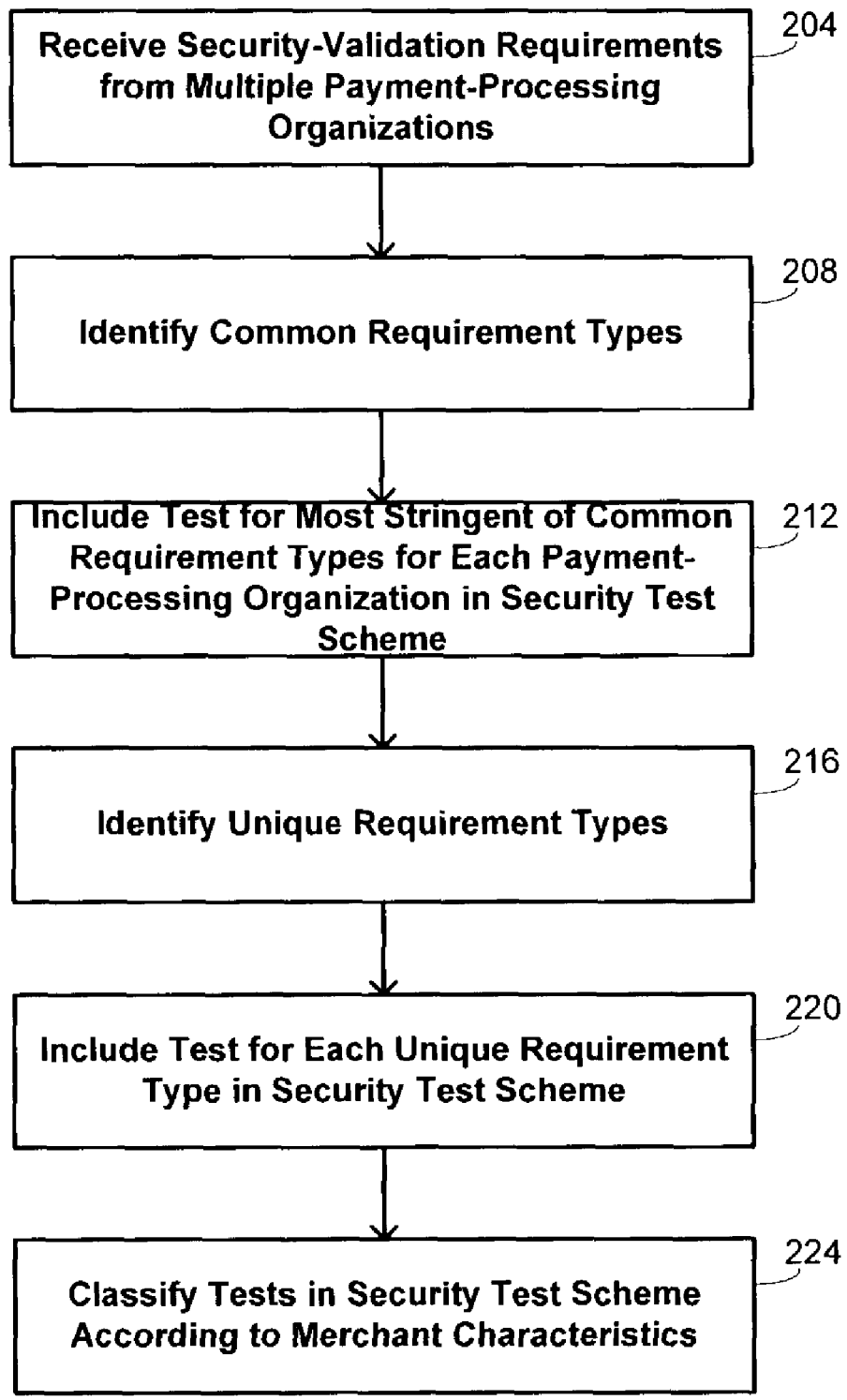
FIG. 2 is a flow diagram illustrating a method for developing a security test scheme to accommodate multiple security requirements in an embodiment of the invention.

FIG. 2 provides a flow diagram that illustrates one method that may be used to derive a security test scheme in an embodiment of the invention. Satisfaction of the test requirements by a merchant entity ensures that the merchant entity is in compliance with the sets of security requirements defined by each of a plurality of payment-processing organizations. Use of such a security test scheme thus simplifies ensuring compliance from the perspective of individual merchant entities and conveniently makes it possible for them to establish such compliance with a single security compliance authority.

At block 204 in FIG. 2, security-validation requirements such as those outlined above are received from multiple payment-processing organizations. Common requirement types are identified at block 208, the common requirement types corresponding to the need for encryption of stored data, the need to have certain security protocols implemented, the need to assign internal identifiers to employees, and other types of requirements described above. For each common requirement type identified as being included in at least two of the sets of security-validation requirements, the most stringent of the common requirement types for each payment-processing organization may be included in the security test scheme at block 212. If there are unique requirement types included in only one of the sets of security-validation requirements, as identified at block 216, a test may be included in the security test scheme for that unique requirement at block 220. To account for the fact that different tests may be used according to different merchant characteristics, the tests included in the security test scheme may be classified at block 224 to reflect such differences. In applying the security test scheme, it may then be appropriate in some embodiments to select those tests appropriate to specific merchant criteria and to exclude others.

The tests included in the security test scheme may take a variety of different forms, some examples of which are described herein. For example, in some embodiments, a particular test may take the form of a remote scan performed of an Internet site maintained by the Internet merchant entities. There are a variety of different techniques know to those of skill in the art in effecting such a scan, including various techniques for testing for vulnerabilities in the Internet or other shared-network site that should be precluded if the security requirements have been implemented by the merchant entity. Thus, detection of the existence of a vulnerability is used to indicate noncompliance with an associated requirement while absence of a vulnerability is used to indicate compliance with the associated requirement. In other embodiments, a particular test may take the form of a questionnaire that includes queries whose truthful response identifies a level of compliance with some of the requirements. For example, the questionnaire may ask what steps have been implement to ensure physical isolation of a system, to ensure access to the system is restricted in the manner required, etc. In still other embodiments, a particular test may take the form of scheduling an on-site audit in which a human representative visits a physical site for the merchant entity and performs an investigation. Such an investigation generally follows a prescribed methodology for identify compliance levels. For example, the investigation may include physical inspections of computer systems used in electronic commerce and physical records maintained by the entity, interviews with employees of the entity, execution of tests or on-site scans with a laptop or other computational device, and the like. Still other tests may be included in the security test scheme in other embodiments.

In addition to the merchant characteristics being used to select certain of the tests comprised by the security test scheme for execution, they may also dictate a frequency for execution. For purposes of illustration, consider the following example for three different payment-processing organizations 116. A first payment-processing organization, Payment-processing organization A, may require (1) that remote scans be performed quarterly for merchant entities having more than 1000 transactions per month over the shared network, but that they be performed annually for other merchant entities, and (2) that an on-line questionnaire be completed quarterly irrespective of the number of transactions per month. A second payment-processing organization, Payment-processing organization B, may require (1) that quarterly scans be performed for those merchant entities having more than 1000 transactions per month over the shared network, but that an on-line questionnaire be completed quarterly for those merchant entities having fewer transactions per month, and (2) that an annual on-site audit be performed for the 100 largest merchant entities. A third payment-processing organization, Payment-processing organization C, may have no frequency requirements, but promulgates general security requirements regarding the protection of cardholder information. In this example, one security test scheme may include (1) a remote assessment in which a questionnaire is required to be completed quarterly, supplemented by annual or quarterly remote scans depending on shared-network transaction volume, and (2) an on-site assessment performed annually with quarterly scans for the 100 largest merchant entities. It is clear that implementation of such a security test scheme by the security compliance authority ensures that the individual requirements of each of Payment-processing organizations A, B, and C are met.

Figure 3:
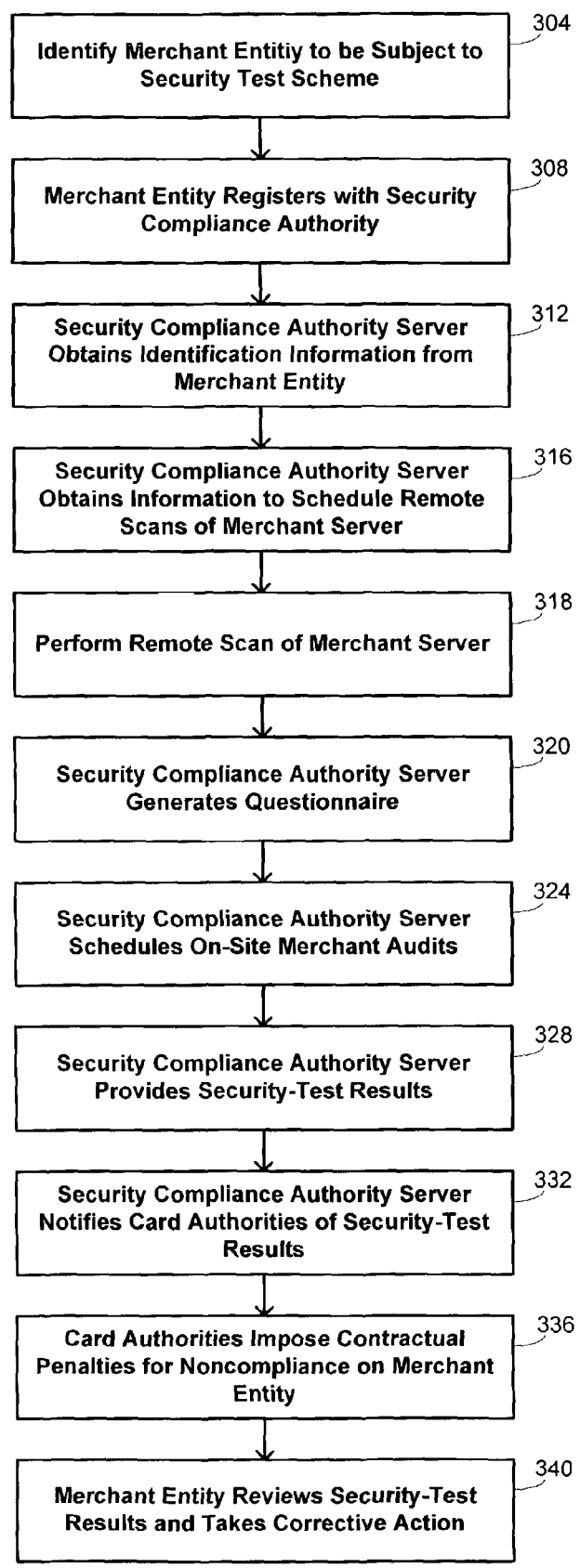
FIG. 3 is a flow diagram illustrated a method for assessing a security risk for a merchant entity in an embodiment of the invention.

After the security test scheme has been established, it may be used as part of a method for assessing a security risk for an merchant entity, one example of which is illustrated for an embodiment with the flow diagram shown in FIG. 3. At block 304, the merchant entity to be subject to the security test scheme is identified. Such identification may be prompted by a payment-processing organization that identifies merchants who are authorized to execute transactions using its cards or may be prompted by the merchant entity itself, who wishes to participate in the risk-assessment program. At block 308, the identified merchant entity registers with the security compliance authority. Such registration may conveniently take place by a representative of the merchant entity connecting to the security compliance authority server 104 over the Internet or other shared network 100 to enter registration information into a formatted template. As part of this process, the security compliance authority server 104 may obtain a variety of different types of relevant information, including identification information as indicated at block 312 and information used in scheduling remote scans as indicated at block 316. The identification information could comprise, for example, identifications of principals of the merchant entity, business addresses of the merchant entity, and the like. Information used in scheduling remote scans could universal resource locators ("URLs") used by the merchant entity, times of scheduled maintenance operations, traffic patterns, and the like.

When the security test scheme is implemented, a remote scan of the merchant server may be performed at block 318 as dictated by conditions of the security test scheme, such as depending on characteristics of the merchant entity, and by the information collected at block 316. In addition, a questionnaire may be generated at appropriate intervals at block 320 by the security compliance authority server. When required by the security test scheme, the security compliance authority server may also schedule on-site audits as indicated at block 324. These various elements of the security test scheme are thus implemented in accordance with the security test scheme, ensuring that individual security requirements promulgated by payment-processing organizations are met.

The results of the security test scheme for each merchant entity may be made available to that merchant entity as indicated at block 328. Conveniently, such results may be provided at the security compliance authority server 104 so that they may be retrieved at the convenience of the merchant entity, although they may alternatively be sent by post, by electronic mail, fax, or any other convenient means. The security compliance authority server also notifies the relevant card authorities of the security test results as indicated at block 332. Such notification may take the same form as the presentation provided for the merchant entity, although it may alternatively take a different form. In some instances, the security compliance authority server may map the results from the security test scheme into a format that addresses the specific requirements of the individual payment-processing organizations. Such a scheme may simplify review of the results by the respective payment-processing organizations. If that review indicates that the merchant entity in noncompliant in some fashion, contractual penalties may be imposed by the payment-processing organization as indicated at block 336. In addition, the availability of the results to the merchant entity permits that entity to review the results and take appropriate corrective action to bring the merchant entity into compliance.

Figure 4:
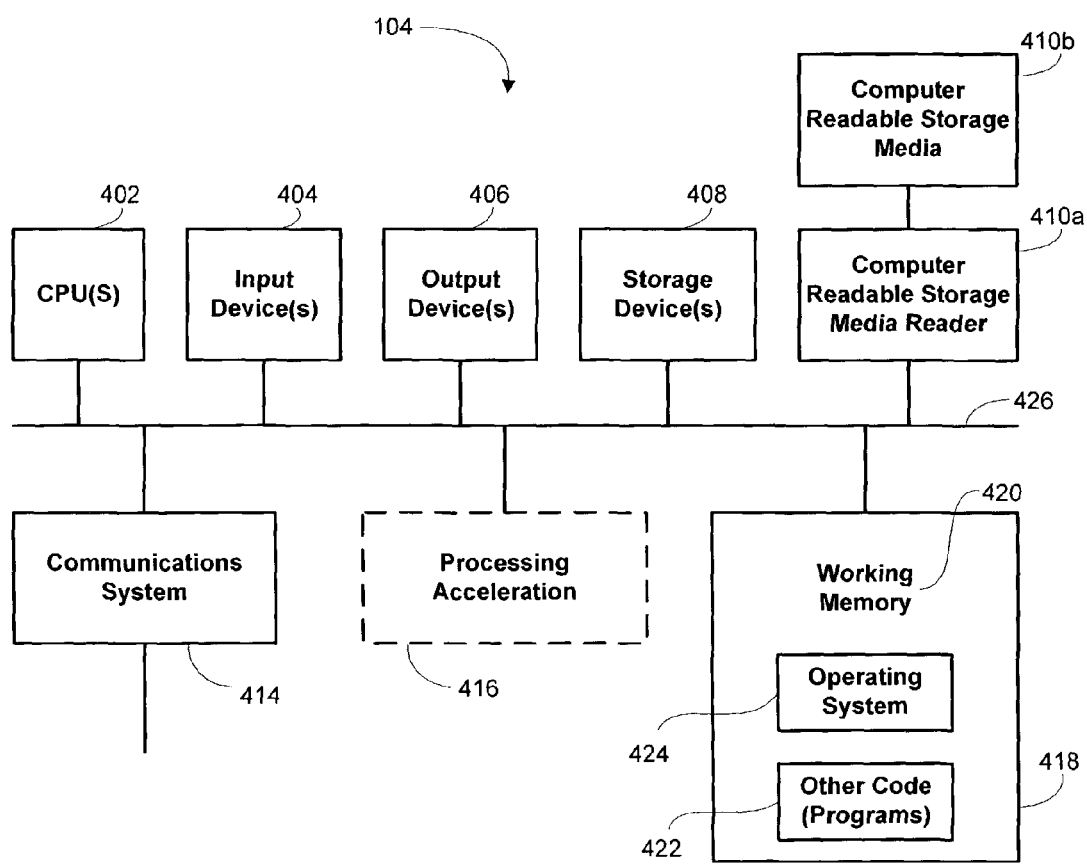
FIG. 4 is a schematic illustration of a security compliance authority server on which methods of the invention may be embodied.

FIG. 4 provides a schematic illustration of a structure that may be used to implement the security compliance authority server 104. FIG. 4 broadly illustrates how individual system elements may be implemented in a separated or more integrated manner. The security compliance authority server 104 is shown comprised of hardware elements that are electrically coupled via bus 426, including a processor 402, an input device 404, an output device 406, a storage device 408, a computer-readable storage media reader 410a, a communications system 414, a processing acceleration unit 416 such as a DSP or special-purpose processor, and a memory 418. The storage device 408 may hold parameters used in identifying the card authorities 116, merchants 112, Internet merchant gateways 114, as well as in defining parameters of the security test scheme to be implemented. The computer-readable storage media reader 410a is further connected to a non-transitory computer-readable storage medium 410b, the combination comprehensively representing remote, local, fixed, and/or removable storage devices plus storage media for temporarily and/or more permanently containing computer-readable information. The communications system 414 may comprise a wired, wireless, modem, and/or other type of interfacing connection and permits data to be exchanged with the Internet 100, the card authorities 116, and/or the Internet merchant entities to implement embodiments as described above.

The security compliance authority server 104 also comprises software elements, shown as being currently located within working memory 420, including an operating system 424 and other code 422, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for implementing a security risk assessment for a merchant entity having connectivity to a shared network, the method comprising:
receiving at a host computer system including a processor, from each of a plurality of payment-processing organizations, a set of security requirements defining protocols for implementing commercial transactions over the shared network using instruments identified with the payment-processing organization;
developing, with the processor at the host computer system, a security test scheme having a set of test requirements whose satisfaction by the merchant entity is sufficient to ensure compliance with the sets of security requirements defined by each of the plurality of payment-processing organizations;
performing a remote scan of a network site maintained by the merchant entity on the shared network in support of shared-network commercial transactions with a security compliance authority server by the host computer system, the remote scan implementing at least a subset of the set of test requirements to evaluate compliance by the merchant entity; and
transmitting a questionnaire from the host computer system to the merchant entity with the security compliance authority server, the questionnaire including queries whose truthful response identifies a level of compliance with at least some of the test requirements.

2. The method recited in claim 1 further comprising scheduling an on-site audit at the merchant entity with the security compliance authority server, the on-site audit being structured to follow a prescribed methodology for identifying a level of compliance with at least some of the test requirements.

3. The method recited in claim 1 wherein a satisfaction level of the test requirements required for compliance with the test requirements is dependent on a characteristic of the merchant entity.

4. The method recited in claim 3 wherein the characteristic comprises a shared-network transaction volume processed by the merchant entity over the shared network.

5. The method recited in claim 1 wherein a frequency of performing the remote scan is dependent on a characteristic of the merchant entity.

6. The method recited in claim 5 wherein the characteristic comprises a shared-network transaction volume processed by the merchant entity over the shared network.

7. The method recited in claim 1 further comprising receiving information describing characteristics of the merchant entity from the merchant entity at the host computer system to limit parameters of the remote scan.

8. The method recited in claim 1 further comprising generating a report at the host computer system summarizing a level of compliance by the merchant entity with the set of test requirements as determined from performing the remote scan.

9. The method recited in claim 1 wherein the merchant entity comprises an Internet merchant.

10. The method recited in claim 1 wherein the merchant entity comprises an Internet merchant gateway.

11. A method for assessing a security risk for a merchant entity having connectivity to a shared network, the method comprising:
receiving information, at a host computer system including a processor, describing characteristics of the merchant entity from the merchant entity;
determining at the host computer system using the processor which test requirements of a security test scheme to use in assessing the security risk for the merchant entity, wherein the security test scheme includes a set of test requirements whose satisfaction by the merchant entity is sufficient to ensure compliance with a plurality of sets of security requirements defined by a plurality of payment-processing organizations; and
executing the security test scheme with a security compliance authority server in accordance with the determined test requirements, wherein executing the security test scheme comprises transmitting a questionnaire from the host computer system to the merchant entity with the security compliance authority server, the questionnaire including queries whose truthful response identifies a level of compliance with at least some of the test requirements.

12. The method recited in claim 11 wherein executing the security test scheme comprises performing a remote scan of a network site maintained by the merchant entity on the shared network in support of shared-network commercial transactions with the security compliance authority server.

13. The method recited in claim 11 wherein executing the security test scheme comprises scheduling an on-site audit at the merchant entity with the security compliance authority server, the on-site audit being structured to follow a prescribed methodology for identifying a level of compliance with at least some of the test requirements.

14. The method recited in claim 11 wherein determining which test requirements of the security test scheme to use in assessing the security risk for the merchant entity is dependent on a characteristic of the merchant entity.

15. The method recited in claim 14 wherein the characteristic comprises a shared-network transaction volume processed by the merchant entity over the shared network.

16. The method recited in claim 11 further comprising generating a report at the host computer system summarizing a level of compliance by the merchant entity with the set of determined test requirements as evaluated from executing the security test scheme.

17. The method recited in claim 11 wherein the merchant entity comprises an Internet merchant.

18. The method recited in claim 11 wherein the merchant entity comprises an Internet merchant gateway.

19. A non-transitory computer-readable storage medium having a computer-readable program embodied therein for direction operation of a security compliance authority server including a communications system, a processor, and a storage device, wherein the computer-readable program includes instructions for operating the security compliance authority server to assess a security risk for an merchant entity having connectivity to a shared network in accordance with the following:

receiving, with the communications system, information describing characteristics of the merchant entity;

determining, with the processor, which test requirements of a security test scheme to use in assessing the security risk for the merchant entity, wherein the security test scheme is stored on the storage device and includes a set of test requirements whose satisfaction by the merchant entity is sufficient to ensure compliance with a plurality of sets of security requirements defined by a plurality of payment-processing organizations; and executing, with the processor, the security test scheme in accordance with the determined test requirements, wherein executing the security test scheme comprises transmitting a questionnaire from the host computer system to the merchant entity with the security compliance authority server, the questionnaire including queries whose truthful response identifies a level of compliance with at least some of the test requirements.

20. The computer-readable storage medium recited in claim 19 wherein the instructions for executing the security test scheme comprise instructions for performing a remote scan of a network site maintained by the merchant entity on the shared network in support of shared-network commercial transactions.

21. The computer-readable storage medium recited in claim 19 wherein the instructions for executing the security test scheme comprise instructions for scheduling an on-site audit at the merchant entity.

* * * * *